Oct. 14, 1930.　　　H. SCHWARTZMAN　　　1,778,691
TAG FASTENER
Filed July 9, 1929
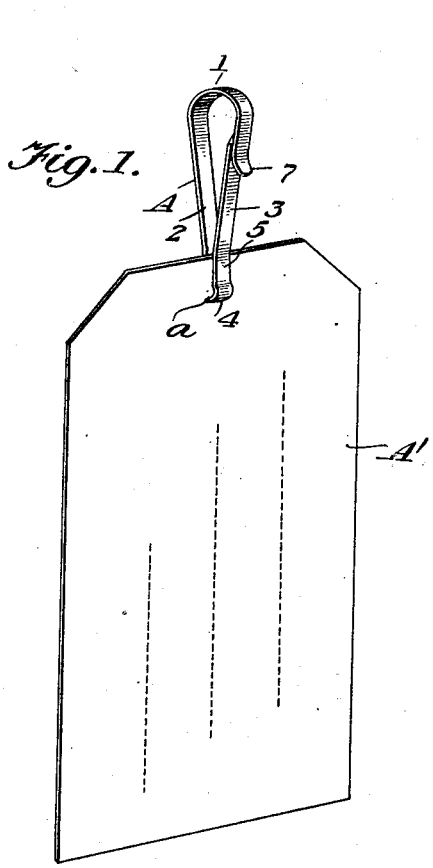
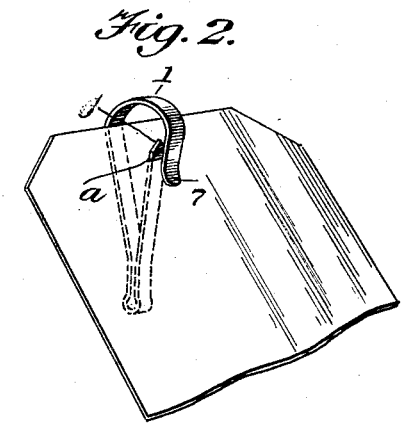
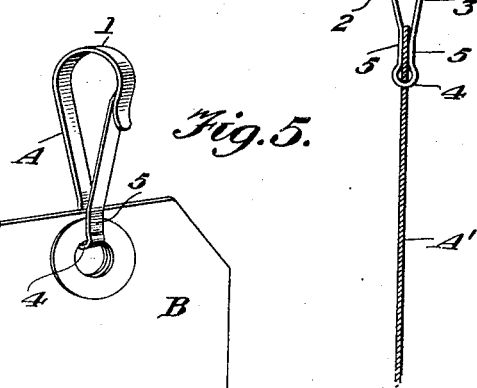
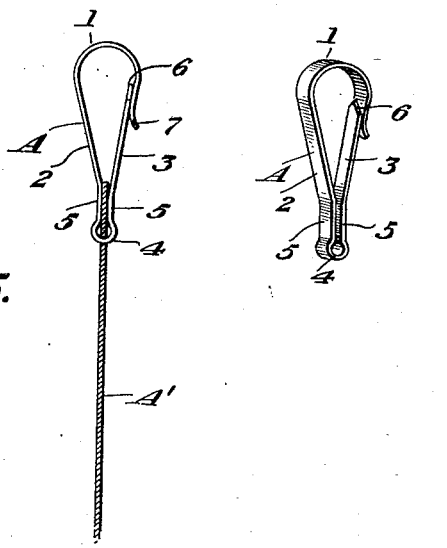
INVENTOR.
Harry Schwartzman
BY
Victor J. Evans
ATTORNEY.

Patented Oct. 14, 1930

1,778,691

UNITED STATES PATENT OFFICE

HARRY SCHWARTZMAN, OF JERSEY CITY, NEW JERSEY

TAG FASTENER

Application filed July 9, 1929. Serial No. 376,925.

This invention relates to a tag fastener, the general object of the invention being to make the fastener in the form of a hook having a spring tongue provided with a pointed end whereby the tongue can be pressed through a tag or the like, so that the device can be easily and quickly attached to a tag which is not provided with an eye, though it will, of course, be understood that the tongue can be passed through an eye of the tag when the device is used with such tags.

Another object of the invention is to so form the shank of the hook and the tongue that they will act to clamp a portion of the tag between them, so that the tag is firmly held by the device and cannot have swinging movement thereon.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a view showing the improved device attached to a tag.

Figure 2 is a view showing how the tongue is positioned to penetrate a tag.

Figure 3 is a vertical sectional view through Figure 1.

Figure 4 is a perspective view of the device.

Figure 5 is a view showing the device used with a tag having an eye.

As shown in these views, the device A is formed of a single strip of flat stock and comprises the hook part 1, the shank 2 and the tongue 3. The metal is bent to form an eye 4 at the junction of the shank with the tongue and both the shank and tongue, adjacent the eye, are formed with flat portions 5 which parallel each other. From these flat or straight portions, the shank and tongue diverge toward the hook part. The resiliency of the tongue holds its free end against the hook, as shown, and said free end of the tongue is pointed, as shown at 6, and the beak of the hook is slightly curved outwardly, as shown at 7.

From the foregoing it will be seen that by applying pressure to the tongue to force it away from the beak of the hook, the device can be slipped over an edge of a tag A or other member and then by pushing slightly upon the device, the pointed end of the tongue will penetrate the tag, as shown at a in Figure 2. Then the tag and device are manipulated to bring that portion of the tag between its point of penetration by the tongue and its edge in the space between the parts 5 of the tongue and shank so that these parts 5 will set up a clamping action on that part of the tag which is located between them. A portion of the eye will pass through the slit made by the tongue, as shown in Figures 1 and 3. Thus the tag is firmly held by the device and cannot have swinging movement therein and it is not necessary to provide the tag with an eye in order to connect the fastener thereto. However, the device can be used with a tag having an eye, as shown in Figure 5. In this case, the tongue is simply passed through the eye in the tag B until a portion of the tag enters the space between the parts 5 so that these parts will clamp the tag as before described.

In removing the device from the tag, the tag is simply pushed up the tongue or the device moved to cause the tag to enter the hook portion of the device and then the tongue is pushed inwardly so that a portion of the tag can be passed between the tongue and the beak of the hook.

From the above it will be seen that the fastener can be easily and quickly attached to a tag or the like and just as easily detached therefrom. The device can be used for attaching tags and the like to various articles by placing the hook portion of the device over a part of the article.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. The combination with a tag having an aperture near one end thereof, of a fastener projecting from said tag for securing the same to an article to be identified; said fastener comprising a strip of resilient material progressively bent to form a tongue having a free extremity, a portion snugly received in said aperture, a shank and a hook portion having a bill engaged by the said free extremity; said aperture and the portion received therein being of similar non-circular contour.

2. The combination with a tag, of a fastener projecting therefrom and means for securing the fastener to the tag and preventing free relative movement between them; said fastener comprising a strip of resilient material progressively bent to form a tongue having a free end, an eye portion, a shank and a hook portion having a bill engaged by said free end and said means comprising an aperture near one end of the tag receiving a wall of said eye portion and portions of said tongue and shank adjoining said eye portion flattened to frictionally engage said tag.

3. The combination with a tag, of a fastener device comprising a member formed of a single strip of spring metal and including a hook extending outwardly from said tag and having a shank and a tongue, the strip being bent at the junction of the tongue with the shank to form an eye and said tongue and shank having parallel portions adjacent the eye forming clamping means, said tongue having its free end pointed whereby said tongue can be passed through the tag and the device moved to a position where the eye will pass through the hole made by the tongue and a part of the tag will be clamped between the clamping portions of the tongue and shank and said free end normally engaging the bill of said hook.

In testimony whereof I affix my signature.

HARRY SCHWARTZMAN.